(12) United States Patent
Nevis et al.

(10) Patent No.: US 6,581,159 B1
(45) Date of Patent: Jun. 17, 2003

(54) SECURE METHOD OF UPDATING BIOS BY USING A SIMPLY AUTHENTICATED EXTERNAL MODULE TO FURTHER VALIDATE NEW FIRMWARE CODE

(75) Inventors: Bryon S. Nevis, Aloha, OR (US); Mark Albrecht, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/471,943

(22) Filed: Dec. 23, 1999

(51) Int. Cl.[7] ............................. G06F 9/445; H04L 9/32
(52) U.S. Cl. ............................ 713/2; 713/187; 713/191
(58) Field of Search ........................... 713/2, 187, 173, 713/176, 188, 191, 193

(56) References Cited

U.S. PATENT DOCUMENTS

| 5,579,522 | A | | 11/1996 | Christeson et al. | |
|---|---|---|---|---|---|
| 5,671,413 | A | | 9/1997 | Shipman et al. | |
| 5,778,070 | A | * | 7/1998 | Mattison ................ | 713/191 |
| 5,859,911 | A | * | 1/1999 | Angelo et al. ............. | 713/187 |
| 6,122,733 | A | | 9/2000 | Christeson et al. | |
| 6,266,809 | B1 | * | 7/2001 | Craig et al. ................ | 717/173 |
| 6,401,208 | B2 | * | 6/2002 | Davis et al. ................ | 713/193 |

OTHER PUBLICATIONS

U.S. patent application Ser. No. 08/941,535, filed Sep. 30, 1997.

* cited by examiner

Primary Examiner—Thomas Lee
Assistant Examiner—Eric Chang
(74) Attorney, Agent, or Firm—Howard A. Skaist

(57) ABSTRACT

Briefly, in accordance with one embodiment of the invention, a method of updating BIOS using an externally provided module may include the following. In this context, the term externally provided means that the module resides in a device other than that used to hold the firmware code, such as a magnetic storage device, typically with a lower cost per bit of information. In this embodiment, the BIOS, while in control of or being executed by a processor, applies a one-way hash process to a portion of the externally provided module. The computed hash of the module portion is compared with the pre-computed hash value included with the BIOS code. The external module is then invoked as a subprogram if and only if the hash values compare as equal. The module, while executing, may then validate the remainder of the update using more sophisticated cryptographic techniques and/or perform the update directly.

25 Claims, 3 Drawing Sheets

SECURE METHOD OF UPDATING BIOS BY USING A SIMPLY AUTHENTICATED EXTERNAL MODULE TO FURTHER VALIDATE NEW FIRMWARE CODE

BACKGROUND

1. Field

This disclosure relates to basic input-output systems (BIOS) and, more particularly, to updating BIOS.

2. Background Information

As is well-known, system firmware is a relatively expensive form of memory in comparison with alternatives, such as random access memory and disk storage, for example. It is noted that through out this document the term "firmware" may refer to a memory device, such as flash memory, for example, or, alternatively, to the code stored on the device, depending on the particular context. Due to this expense, firmware is typically space constrained. Therefore, in many instances, it may be desirable to provide an externally originating BIOS, e.g., a non-resident part of the firmware, that may be used to update or supplement the existing BIOS. For example, such an externally provided module may include bug fixes or special purpose code to be executed once and then erased or discarded. One issue when updating BIOS is ensuring that the update is relatively resistant to tampering. Often, however, making an update tamper resistant may involve a large amount of additional code space in the firmware, such as if cryptographic techniques are implemented in code. A need, therefore, exists for a technique to update BIOS at run time that is both efficient in terms of size or memory utilization and also relatively resistant to tampering by unauthorized intruders.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

Figure 1:
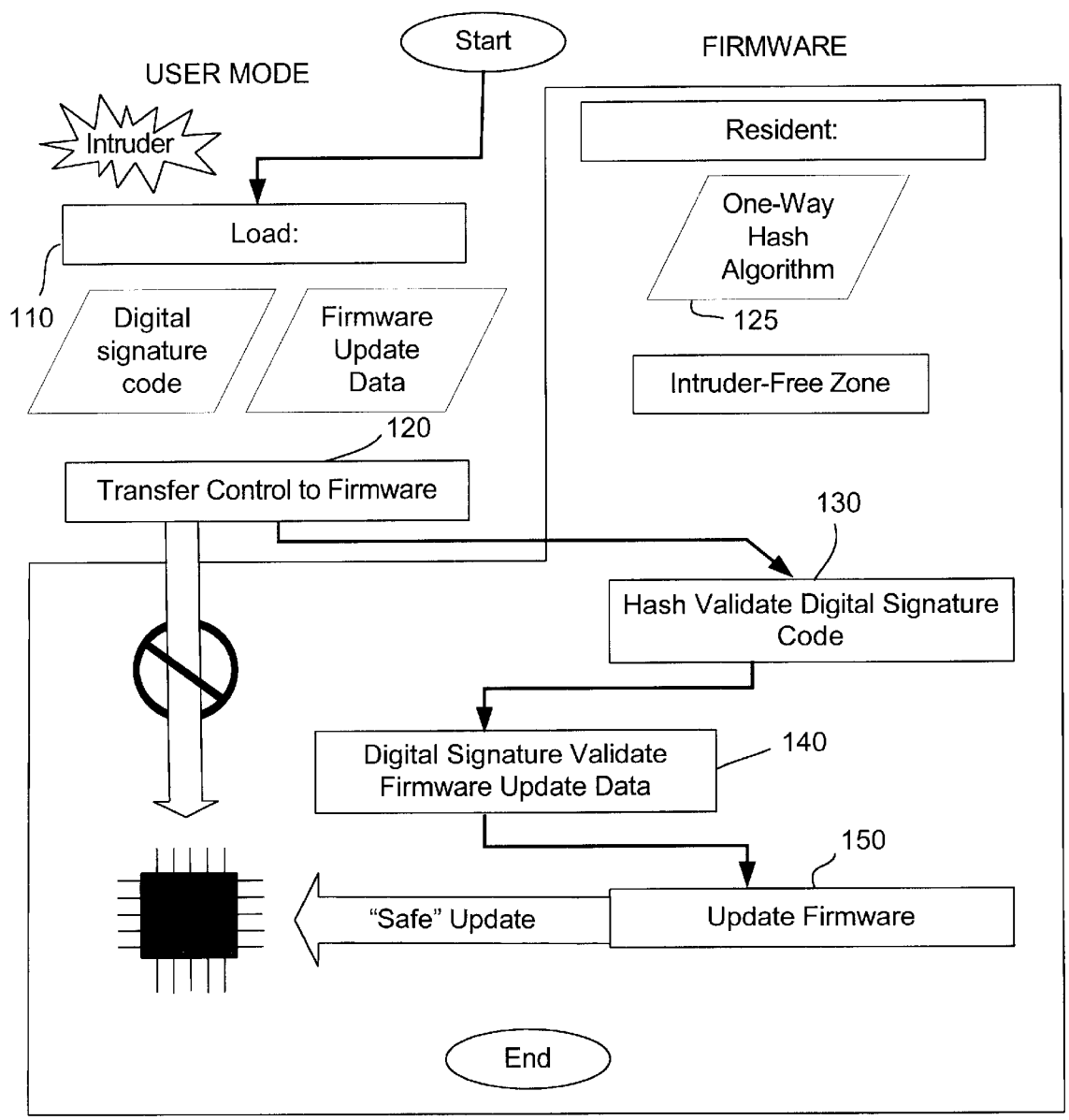
FIG. 1 is a flow diagram illustrating an embodiment of a method of updating BIOS in accordance with the present invention.

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in details so as not to obscure the present invention.

Some portions of the detailed description which follow are presented in terms of algorithms and symbolic representations of operations on data bits or binary digital signals within a computer or a computing system memory. These algorithmic descriptions and representations are the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing" or "computing" or "calculating" or "determining" or the like, refer to the action and processes of a computer or computing system, or similar electronic computing device, that manipulate and transform data represented as physical (electronic) quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or a computing system selectively activated or reconfigured by a program stored in the computer or computing system. Such a program may be stored in a readable storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and coupled to a system bus.

The algorithms and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems may appear from the description below. In addition, embodiments of the present invention are not described with reference to any particular programming language. It will be appreciated that a variety of programming languages may be used to implement the teachings of the invention as described herein.

Briefly, in accordance with one embodiment of the invention, a method of updating BIOS using an externally provided module may include the following. In this context, the term externally provided means that the module resides in a device other than that used to hold the firmware code, such as a magnetic storage device, typically with a lower cost per bit of information. In this embodiment, the BIOS, while in control of or being executed by a processor, applies a one-way hash process to a portion of the externally provided module. The computed hash of the module portion is compared with the pre-computed hash value included with the BIOS code. The external module is then invoked as a subprogram if and only if the hash values compare as equal. The module, while executing, may then validate the remainder of the update using more sophisticated cryptographic techniques and/or perform the update directly.

In this context, the term "one-way hash" refers to an implementation of a secure one-way hash process, such as SHA-1, RSA MD2, RSA MD4, RSA MD5, or Snefru, to name only a few. See, e.g., *Applied Cryptography*, by Bruce Schneider, available from John Wiley & Sons, 2d Ed., 1996. A secure one-way hash, to be considered secure, in this context, has the property that no two messages may be found to hash to the same resulting value. Thus, the hash value provides a digital "fingerprint" of the original message that is both smaller in space and more limited in capability than a digital signature. "Digital signatures" are also well-known and generally refer to a process by which an electronic message may be verified for its integrity and authenticity. See, e.g., *Applied Cryptography*, by Bruce Schneider, available from John Wiley & Sons, 2d Ed., 1996. One distinction between a one-way hash and a digital signature process is that, for a digital signature process, both the message and the signature may vary so that several messages may be traced back to or associated with one originator. In contrast, a secure one-way hash has a one-to-one correspondence between the message and the hash value such that a given hash value is associated with exactly one message from an originator. Likewise, in this context, the terms "firmware update" and "BIOS update" mean a process by which a hardware memory device, such as flash memory, for example, including system firmware code is reprogrammed using a combination of hardware and software commands. One technique for updating BIOS that may be employed, although, the invention is not limited in scope in this respect, is disclosed in U.S. Pat. No. 5,579,522, titled "Dynamic Non-volatile Memory Update in a Computer System," by Orville H. Christeson et al., issued Nov. 26, 1996, assigned to the assignee of the current invention.

As previously indicated, firmware is a relatively expensive form of memory in comparison with alternatives, such as random access memory, a magnetic disk or tape devices, for example. Therefore, system firmware code is typically limited in size for economic reasons. This is sometimes referred to as having a small "footprint." The significance of the firmware code as a component that may affect the operation of an overall computing system, such as one including a processor, such as a microprocessor, makes it desirable that it be protected from tampering; however, there is typically a limited amount of space available for code and the like to accomplish this goal.

Figure 3:
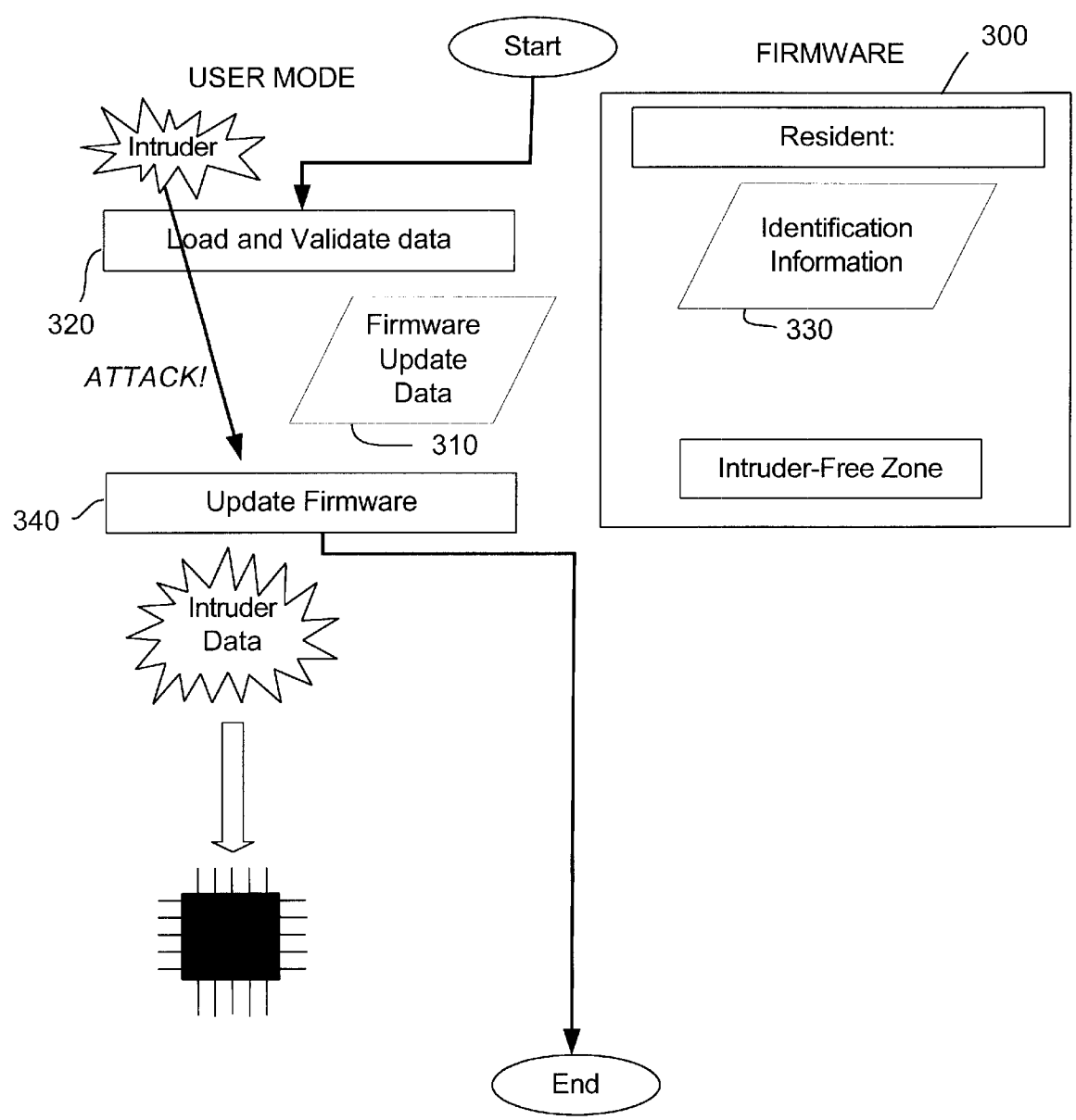
FIG. 3 is a flow diagram illustrating one technique that may be employed to update BIOS.

One technique for updating BIOS is illustrated in FIG. 3, referred to as "competing solution 1." Unfortunately, this approach has some disadvantages. A BIOS update package is provided, including a firmware update application and firmware update data, as illustrated, for example, in FIG. 3 by 310. Typically, this package may be provided on a magnetic disk or, alternatively, it may be downloaded from the Internet, for example. It may be provided by any one of a number of techniques. As illustrated in FIG. 3 by block 320, the disk operating system, in this example, loads the firmware update application into random access memory and transfers processor control to the application. The firmware update application may then perform some validation to verify that the firmware update is the correct one for the target computing platform or system and that the update data is not corrupt. The firmware update application then performs the update by directly or indirectly write enabling the firmware memory, typically implemented with flash memory, and then loading the update data into the firmware in a manner that may be specified by the system or firmware manufacturer, for example. This is illustrated in FIG. 3 by block 340. As illustrated in FIG. 3, a portion of firmware 300, in particular, identification information 330, that may have been used during the validation procedure, might be stored in portions of firmware or flash memory in a tamper-resistant manner, such as by some form of write protection or encryption. Nonetheless, once the firmware memory has been write enabled, this provides an intruder the ability to interrupt operation of the update application and tamper with the firmware contents. Therefore, this approach, although providing the capability to update BIOS, has some disadvantages.

Figure 2:
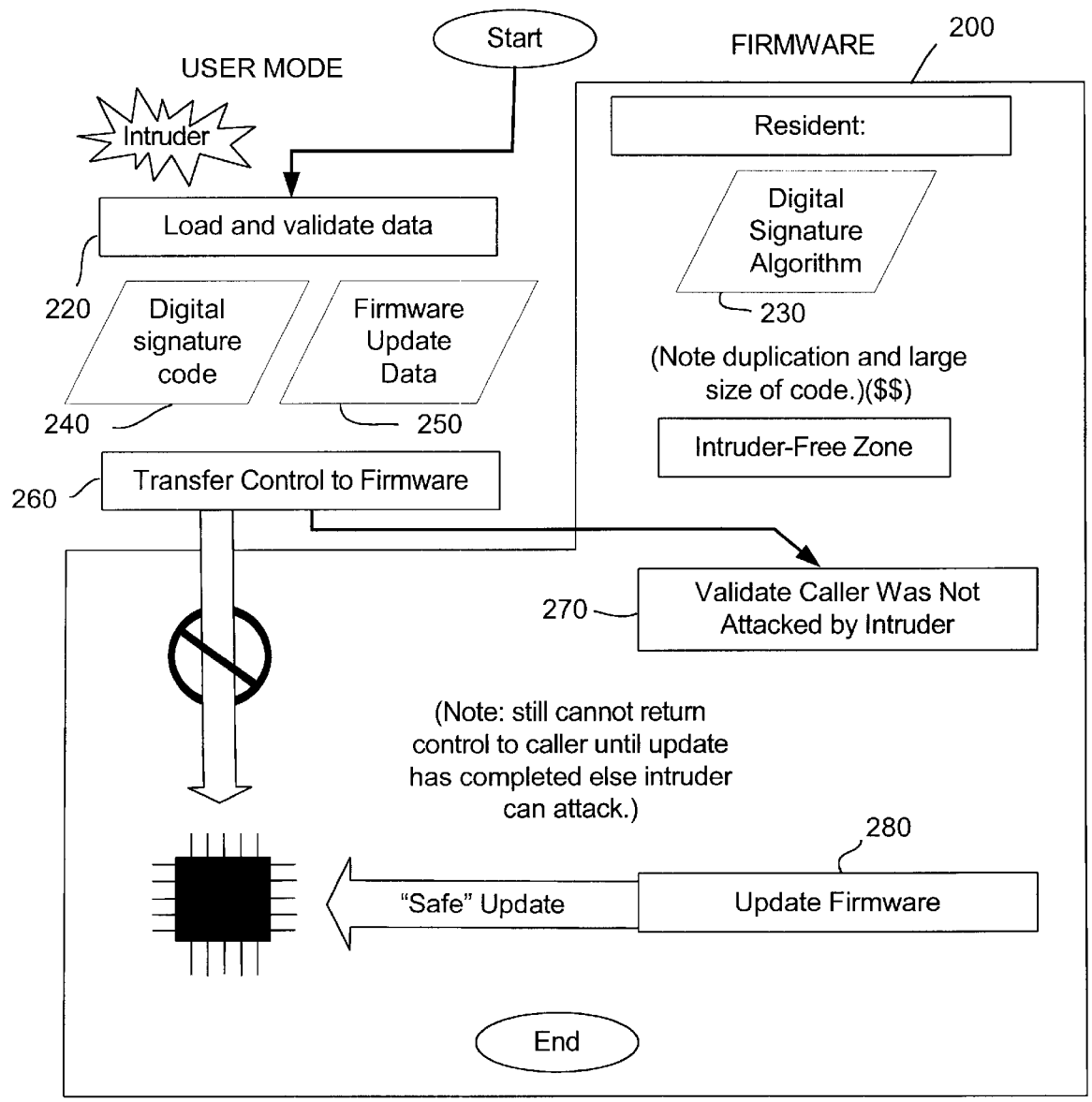
FIG. 2 is a flow diagram illustrating another technique for updating BIOS using digital signature techniques.

FIG. 2 is a flow diagram illustrating an alternative technique for updating BIOS using digital signature techniques, referred to as "competing solution 2." This approach has some advantages over the approach illustrated in FIG. 3. As illustrated in FIG. 2 by block 220, the firmware update application is executed by the disk operating system. As in the previous example discussed in connection with FIG. 3, the firmware update application performs the update. Here, this is accomplished, not by manipulating the hardware directly, as was done in the previous example. Instead, a protected privileged firmware subroutine, such as 230, is invoked that is protected by cryptographic or other means. The subroutine then uses digital signature techniques, such as with 240, to either validate and install the update if and only if the validation succeeded, or by validating and invoking the caller as a subprogram within a privileged context to complete the update if and only if validation succeeded.

The technique illustrated in FIG. 2 and described above has advantages over the technique illustrated in FIG. 3 and previously described; however, it does have some disadvantages as well. One advantage is that it provides a more secure technique for updating firmware, as the previous description suggests. Specifically, the digital signature process residing within firmware 200, when executed, is employed to reduce the opportunity for an intruder to tamper with the firmware update. However, one disadvantage is the use of space in the firmware when a code implementation of a digital signature process is used. As indicated, the firmware stores the code to execute the digital signature process in a portion of firmware that may not be tampered with by an intruder. Typically, the code to implement such a process may use a significant portion of firmware memory and, therefore, may ultimately prove to be expensive. Another disadvantage is that this approach may be "overly permissive" by allowing the caller to execute arbitrary pieces of code in a privileged context as long as a valid digital signature is provided. For this to operate satisfactorily, the update utility and the firmware code should be prepared by the same or related parties; however, this is not always practical or desirable depending on the specific situation.

FIG. 1 is a diagram illustrating an embodiment of a method of updating BIOS in accordance with the present invention. In this particular embodiment, again, a BIOS update package is provided. The package, in this embodiment, in addition to the update application and the update data, includes an additional piece of executable code known as the external BIOS module. This module may be prepared by the system vendor, in this embodiment, and, therefore, may be considered part of the BIOS, whereas the update application could, in this embodiment, be prepared by someone or an entity other than the system vendor. Of course, the invention is not limited in scope in this respect. This module, when executed by a processor or similar device, will, in this embodiment, implement a digital signature process. As in the previously described approaches, the update process beings with the disk operation system loading the firmware update application into random access memory, such as at block 110, and transferring processor control to a privileged firmware subprogram that is protected from intruder tampering by cryptographic or other means, such as illustrated by block 120. In contrast to the previous approaches, however, processor control is not returned to the update application. Instead, in this embodiment in accordance with the invention, firmware subprogram 125 applies a one-way hash process to the external BIOS module to obtain a computed hash value. The computed hash value is compared with the hash value stored in the portion of the firmware that is free of intruder tampering and that was previously computed and stored when the resident firmware was created. If the hash values compare as equal, the module provided has been proven to be the same as that which existed at the time the firmware was created, illustrated by block 130. Instead of "unlocking" the hardware, as in the previously described approaches, and returning processor control to the caller, the external BIOS module is invoked as a protected privileged firmware subprogram. The external BIOS module then performs the digital signature process to validate the update data, illustrated by block 140. The external BIOS module may then return the results of the validation to the protected firmware subroutine, or directly install the update itself, such as illustrated by 150. Using this embodiment, space is conserved on the firmware device by computing a one-way hash on code that changes infrequently, in this embodiment the digital signature code, and then using that externally provided code to verify the update data, rather than the alternative of providing the digital signature code directly in the firmware where it may seldom, if ever, be executed due to its special purpose in this context.

This embodiment provides several advantages. It effectively reduces product cost by reducing the size of the BIOS footprint in firmware. As previously described, by using this technique portions of the firmware may be provided electronically, rather than being permanently programmed into a more expensive and non-volatile storage device, such as flash memory. This also provides an advantage in comparison with, for example, the technique illustrated in FIG. 2 in that a one-way hash process, such as for this embodiment, typically employs less memory than a digital signature process. This embodiment is also more secure than the two approaches previously described, for reasons previously explained.

It will, of course, be understood that, although a particular embodiment has just been described, the invention is not limited in scope to a particular embodiment or implementation. For example, although the invention is not limited in scope in this respect, one embodiment may comprise an article, such as a storage medium or memory. Such a storage medium, such as, for example, a hard disk, may have stored thereon instructions, which when executed by a system, such as a computing system or platform, may result in BIOS being updated in accordance with the invention, such as, for example, the embodiment previously described. Likewise, in an alternative embodiment, the instructions may be stored on a CD-ROM, a magnetic disk, a flip-flop, or other storage medium for storing such instructions.

In yet another alternative embodiment, a computing system may comprise a processor, such as a microprocessor, memory, such as random access memory, firmware, having BIOS, and a system bus coupling together these components. The hard disk may have stored thereon instructions, which when executed by a system, such as a computing system or platform, may result in BIOS being updated in accordance with the invention, such as, for example, the embodiment previously described While certain features of the invention have been illustrated as described herein, many modifications, substitutions, changes, and equivalents will now occur to those skilled in the art. It is, therefore, to be understood that the appended claims are intended to cover all such embodiments and changes as fall within the true spirit of the invention.

What is claimed is:

1. A method of updating BIOS stored in firmware using an externally provided module comprising:

applying a one-way hash to at least a portion of the externally provided module to thereby obtain a computed hash value;

comparing the computed hash value with a pre-computed hash value;

transferring program control to the externally provided module if the hash values compare equal; and validating the module using a digital signature process implemented by executing code provided as part of the module.

2. The method of claim 1, and further comprising:

updating the BIOS stored in firmware with the BIOS update.

3. The method of claim 2, wherein updating the BIOS stored in firmware comprises:

erasing selected portions of the BIOS stored in firmware; and loading the BIOS update into the erased selected portions.

4. The method of claim 1, wherein the firmware comprises flash memory.

5. The method of claim 1, wherein the externally provided module is provided stored on at least any one of the following: a CD-ROM, a magnetic tape, a magnetic disk, and a flip-flop.

6. The method of claim 1, wherein the pre-computed hash value is stored in a protected portion of the firmware.

7. The method of claim 6, wherein the protected portion of the firmware is encrypted.

8. The method of claim 6, wherein the protected portion of the firmware is not write enabled.

9. The method of claim 1, wherein the one-way hash process comprises a secure one-way hash process.

10. The method of claim 9, wherein the secure one-way hash process is substantially in accordance with at least any one of the following: SHA-1, RSA MD2, RSA MD4, RSA MD5, and Snefru.

11. The method of claim 1, wherein the externally provided module includes both the digital signature process in the form of executable code and the BIOS update.

12. An article comprising: a storage medium, having stored thereon instructions, that, when executed by a computing system, result in:

applying a one-way hash to at least a portion of an externally provided module to thereby obtain a computed hash value;

comparing the computed hash value with a pre-computed hash value;

transferring program control to the externally provided module if the hash values compare equal; and validating the module using a digital signature process implemented by executing code provided as part of the module.

13. The article of claim 12, wherein the instructions, when executed, further result in:

updating the stored BIOS with the BIOS update.

14. The article of claim 13, wherein the instructions, when executed, further result in updating the stored BIOS by:

erasing selected portions of the stored BIOS; and loading the BIOS update into the erased selected portions.

15. The article of claim 12, wherein the article comprises firmware.

16. The article of claim 15, wherein the firmware comprises flash memory.

17. The article of claim 15, wherein the pre-computed hash value is stored in a protected portion of the firmware.

18. The article of claim 17, wherein the protected portion of the firmware is encrypted.

19. The article of claim 18, wherein the protected portion of the firmware is not write enabled.

20. The article of claim 12, wherein the instructions, when executed, further result in the one-way hash process comprising a secure one-way hash process.

21. The article of claim 20, wherein the instructions, when executed, further result in the secure one-way hash process being substantially in accordance with at least any one of the following: SHA-1, RSA MD2, RSA MD4, RSA MD5, and Snefru.

22. The article of claim 12, wherein the externally provided module includes both the digital signature process in the form of executable code and the BIOS update.

23. A computing system comprising:

a processor;

firmware, including BIOS stored thereon;

random access memory;

a hard disk; and a system bus coupling the processor, firmware, memory, and hard disk;

the hard disk further having stored thereon instructions, that, when executed by the computing system, result in:

applying a one-way hash to at least a portion of an externally provided module to thereby obtain a computed hash value;

comparing the computed hash value with a pre-computed hash value;

transferring program control to the externally provided module if the hash values compare equal; and validating the module using a digital signature process implemented by executing code provided as part of the module.

24. The system of claim 23, wherein the instructions, when executed, further result in:

updating the stored BIOS with the BIOS update.

25. The system of claim 24, wherein updating the stored BIOS comprises;

erasing selected portions of the stored BIOS; and loading the BIOS update into the erased selected portions.

* * * * *